United States Patent
Tighe

(10) Patent No.: US 9,951,838 B2
(45) Date of Patent: Apr. 24, 2018

(54) VIBRATION DAMPENING DEVICE

(75) Inventor: Peter John Tighe, Toongabbie (AU)

(73) Assignee: A.C.N. 166 970 627 PTY LTD (AU)

( * ) Notice: Subject to any disclaimer, the term of this patent is extended or adjusted under 35 U.S.C. 154(b) by 1427 days.

(21) Appl. No.: 13/981,570

(22) PCT Filed: Feb. 9, 2011

(86) PCT No.: PCT/AU2011/000133
§ 371 (c)(1),
(2), (4) Date: Jul. 24, 2013

(87) PCT Pub. No.: WO2011/146959
PCT Pub. Date: Dec. 1, 2011

(65) Prior Publication Data
US 2013/0306834 A1    Nov. 21, 2013

Related U.S. Application Data

(60) Provisional application No. 61/388,700, filed on Oct. 1, 2010.

(30) Foreign Application Priority Data

May 28, 2010 (AU) ................................ 2010902364

(51) Int. Cl.
*F16F 9/10* (2006.01)
*E02D 13/02* (2006.01)
*F16F 15/027* (2006.01)

(52) U.S. Cl.
CPC ................ *F16F 9/10* (2013.01); *E02D 13/02* (2013.01); *F16F 15/0275* (2013.01); *F16F 2236/06* (2013.01)

(58) Field of Classification Search
CPC ............ B60G 17/0521; B60G 17/0525; B60G 17/04; B60G 17/048; B60G 17/052;
(Continued)

(56) References Cited

U.S. PATENT DOCUMENTS 3,116,045 A  12/1963 Sherburne
3,120,382 A   2/1964 Paulsen
(Continued)

FOREIGN PATENT DOCUMENTS

CN   101856961 A    10/2010
DE    3145071 A1 *  5/1983  ............... E02D 9/02
(Continued)

OTHER PUBLICATIONS

English machined translation of Specification of DE-4447156 from EPO.*
(Continued)

*Primary Examiner* — Robert A. Siconolfi
*Assistant Examiner* — San M Aung
(74) *Attorney, Agent, or Firm* — Kilpatrick Townsend & Stockton LLP

(57) ABSTRACT

A vibration dampening device (10) including: a first section (20) having a first section support assembly (25) for supporting vibratory equipment (140); a second section 30 having a second section support assembly (35) for allowing the vibration dampening device (10) to be supported by a support apparatus (100); and one or more fluid fillable absorbers (40) located between the first and second sections (20,30), wherein the one or more fluid fillable absorbers (40) are configured to absorb at least a portion of a vibratory force transferred from operation of the vibratory equipment (140).

22 Claims, 18 Drawing Sheets

(58) Field of Classification Search
CPC .............. B60G 17/033; B60G 17/0155; B60G 17/017; B60G 17/06; B60G 15/14; B60G 15/12; B60G 2202/314; B60G 2202/32; B60G 2202/152; B60G 2202/25; B60G 11/27; B60G 2400/252; B60G 2500/10; B60G 2500/2021; B60G 2500/205; B60G 2800/204; B60G 2800/2042; E02D 13/02; E02D 27/34; E02D 7/18; E02D 13/00; F16F 9/10; F16F 15/04; E04H 9/02
USPC ...................... 188/266, 267, 267.1; 248/638; 267/64.16, 136
See application file for complete search history.

(56) References Cited

U.S. PATENT DOCUMENTS

| | | | |
|---|---|---|---|
| 3,828,864 A | | 8/1974 | Haverkamp et al. |
| 3,920,083 A | * | 11/1975 | Makita ...................... E02D 7/06 173/49 |
| 4,972,930 A | * | 11/1990 | Davis ...................... F16F 7/1017 188/379 |
| 5,117,925 A | | 6/1992 | White |
| 5,390,121 A | * | 2/1995 | Wolfe .................. B60G 17/018 188/280 |
| 5,582,385 A | * | 12/1996 | Boyle .................. B60G 17/018 188/266.1 |
| 5,652,704 A | * | 7/1997 | Catanzarite ............ B60N 2/501 248/550 |
| 7,080,958 B1 | | 6/2006 | Morris |
| 7,185,592 B2 | * | 3/2007 | Hommen ........... B60G 17/0272 105/453 |
| 2005/0082127 A1 | * | 4/2005 | Barber ................. B60G 21/073 188/266.2 |
| 2007/0045067 A1 | * | 3/2007 | Schedgick ......... B60G 17/0152 188/266 |

FOREIGN PATENT DOCUMENTS

| | | | | |
|---|---|---|---|---|
| DE | 3145071 A1 | * | 5/1983 | ............... E02D 9/02 |
| DE | 4447156 A1 | | 7/1996 | |
| EP | 0767320 A2 | | 4/1997 | |
| FR | 1263909 A | | 6/1961 | |
| JP | 2-157316 A | | 6/1990 | |
| JP | 4-258550 | | 9/1992 | |
| JP | 4-258550 A | | 9/1992 | |

OTHER PUBLICATIONS

Translation of the Second Office Action for Chinese Patent Application No. 201180066329.2 corresponding to U.S. Appl. No. 13/981,570.

Translation of Office Action for Chinese Patent Application No. 201180066329.2 corresponding to U.S. Appl. No. 13/981,570.

International Search Report and Written Opinion of PCT/AU2011/000133 dated Mar. 31, 2011, 11 pages.

European Search Report corresponding to European Patent Application No. 11785886.0, dated Oct. 14, 2016, eight pages.

* cited by examiner

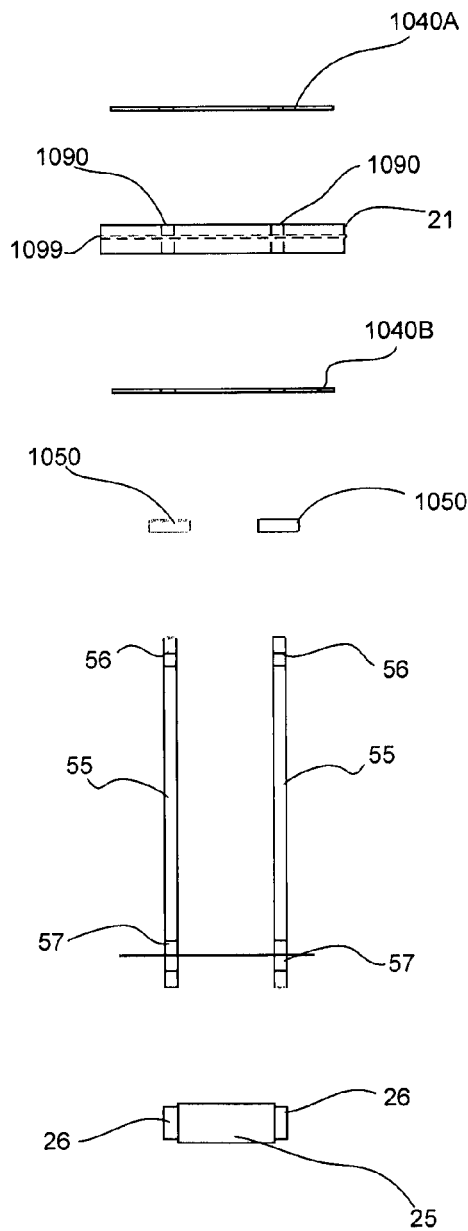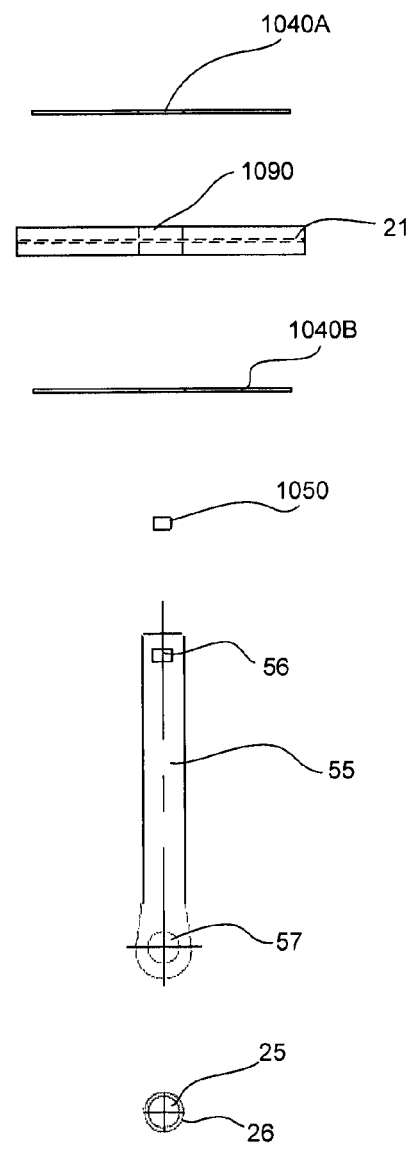
FIGURE 13C
FIGURE 13D

VIBRATION DAMPENING DEVICE

TECHNICAL FIELD

The present invention relates to a vibration dampening device.

BACKGROUND

A common technique for installing sheet elongate members such as piles, anchor members, caissons, and mandrels is to use a vibratory machine, such as a pile driver or vibratory hammer, supported by a support apparatus, such as a crane or the like. In the instance of a pile driver, one end of the vibratory pile driver is supported by the crane, such as via the hook connected to a sling, and the other end of the vibratory pile driver drives against the piling to thereby drive the pile into a ground surface.

Generally, the vibratory pile driver can include a set of eccentric weights, such as cams, which are rotated at high speed to cause the vibratory pile driver to vibrate. The vibratory force created by the vibratory pile driver is then transferred against the end of the pile to thereby drive the pile into the ground surface.

During start-up and shutdown phases of such vibrating equipment, there is generally a considerable amount of vibratory force that transferred to the support apparatus, such as the crane, via the sling. In particular situations, the vibratory force transferred to the crane can lead to a, number of failures. This can include boom failure, excessive wear and tear to major structural components such as pins, sheaves, track gear, and acceleration of structural and metal weld fatigue. These failures can therefore drastically reduce the lifetime of the machines.

Whilst a number of dampening devices have been proposed in the past, these devices generally use elastomeric material to absorb a portion of the vibratory force. However, due to shear strain that is applied to the elastomeric material, these components of these device wear. Furthermore, depending upon the vibratory force that is being transferred, dampening properties of the elastomeric material cannot be altered according to operating conditions.

Therefore, there is a need for a vibration dampening device that overcomes or at least alleviates one or more of the above-mentioned problems, or at least provides a useful commercial alternative.

The reference in this specification to any prior publication (or information derived from it), or to any matter which is known, is not, and should not be taken as, an acknowledgement or admission or any form of suggestion that that prior publication (or information derived from it) or known matter forms part of the common general knowledge in the field of endeavour to which this specification relates.

SUMMARY

In one broad aspect there is provided a vibration dampening device including:
a first section having a first section support assembly for supporting vibratory equipment;
a second section having a second section support assembly for allowing the vibration dampening device to be supported by a support apparatus; and
one or more fluid fillable absorbers located between the first and second sections, wherein the one or more fluid fillable absorbers are configured to absorb at least a portion of a vibratory force transferred from operation of the vibratory equipment.

In one form, the vibratory force transferred to the first section causes the first section to displace toward the second section, wherein the displacement of the first section toward the second section causes the one or more fluid fillable absorbers to compress, thereby at least partially absorbing the vibratory force.

In another form, a portion of the first section support assembly protrudes through one or more second section apertures in the second section, and a portion of the second support assembly protrudes through one or more first section apertures in the first section.

In one embodiment, the portion of the first section support assembly which protrudes through the second section aperture is one or more first section support arms, and the portion of the second section support assembly which protrudes through the first section aperture is one or more second section support arms.

In another embodiment, a first section coupling element is coupled to the one or more first section support arms for coupling the vibratory equipment to vibration dampening device.

In an optional form, a second section coupling element is coupled to the one or more second section support arms for coupling the support apparatus to the vibration dampening device.

In another optional form, the first section includes a first section plate and the second section includes a second section plate, the first and second section plates being respectively parallel and separated by the one or more fluid fillable absorbers.

Optionally, the first section plate and the second section plate respectively include upper and lower rigid sheets.

In one form, the first section plate and the second section plate respectively include an embedded rigid sheet.

In another form, at least one of the first section plate and the second section plate are made substantially from a polymer material.

In one embodiment, the polymer material is polyethylene.

In another embodiment, the one or more fluid fillable absorbers includes an inlet for receiving fluid from a fluid source and an outlet for expelling fluid.

In an optional form, the vibration dampening device includes a fluid control system in fluid communication with the one or more fluid fillable absorbers, wherein the fluid control system is configured to control at least one of the flow of fluid to and from the one or more fluid fillable absorbers.

In another optional form, the fluid expelled from the one or more fluid fillable absorbers is transferred to at least one of:
the fluid source; and
an exhaust assembly.

In an optional embodiment, the vibration dampening device includes a displacement feedback assembly, operatively connected to the fluid control system, for detecting displacement between the first and second sections, wherein the fluid control system is activated upon the displacement feedback assembly detecting displacement.

In another optional embodiment, in the event that the displacement feedback system detects displacement of the second section toward the first section, the fluid control system supplies fluid to the one or more fluid fillable absorbers.

Optionally, in the event that the displacement feedback assembly displacement of the second section toward the first section, the fluid control system expels fluid from the one or more fluid fillable absorbers.

Optionally, the displacement feedback assembly includes:
an arm member operatively coupled to the second section at a first end;
a first leveller operatively coupled to a second end of the arm member and the fluid source, wherein the first leveller is actuated by the arm member when the second section is displaced toward the first section, wherein actuation of the first leveller causes the fluid control system to supply fluid to the one or more fluid fillable absorbers; and
a second leveller operatively coupled to the second end of the arm member and the fluid source, wherein the second leveller is actuated by the arm member when the second section is displaced away from the first section, wherein actuation of the second leveller causes the fluid control system to expel fluid from the one or more fluid fillable absorbers.

In one form, the fluid control system includes a directional control valve unit including:
a first port in fluid communication with the first leveller;
a second port in fluid communication with the second leveller;
a third port in fluid communication with the fluid source;
a fourth port in fluid communication with the one or more fluid fillable absorbers; and
a fifth port in fluid communication with one of:
the exhaust assembly; and
the fluid source via a one way valve.

In another form:
in the event that the first port is actuated via actuation of the first leveller, the third and fourth ports are actuated by the directional control valve unit to allow fluid to be supplied from the fluid source to the one or more fluid fillable absorbers; and
in the event that the second port is actuated via actuation of the second leveller, the fourth and fifth ports are actuated by the directional control valve to allow fluid to be expelled from the one or more fluid fillable absorbers.

In one embodiment, the fluid source is a pressurised gas source, wherein the fluid fillable absorbers are inflatable with pressurised gas.

In another embodiment, the pressurised gas source is a compressed air source.

In an optional form, the one or more fluid fillable absorbers are air bags.

In another optional form, each air bag includes a rolling-lobe and piston configuration.

In one embodiment, the fluid source is a hydraulic fluid source.

In another embodiment, the vibration dampening device includes a plurality of fluid fillable absorbers, wherein a first fluid communication line and a second fluid communication line provide fluid from the fluid source to respective portions of the fluid fillable absorbers at different fluid rates.

In an optional form, the vibration dampening device includes a motor operatively connected to a compressor, wherein the compressor is operatively connected to the fluid supply.

In another optional form, the vibration dampening device includes a receiver unit operatively connected to the motor, wherein the receiver unit is responsive to a remote control unit to control the operation of the motor.

Optionally, the first section includes first walls that extend toward the second section, and the second section includes second walls that extend toward the first section, wherein the first and second walls undergo telescopic movement relative to each other when vibratory force is being partially absorbed by the vibration dampening device.

Other embodiments will be described throughout the description of the example embodiments.

BRIEF DESCRIPTION OF THE FIGURES

Example embodiments should become apparent from the following description, which is given by way of example only, of at least one preferred but non-limiting embodiment, described in connection with the accompanying figures.

FIG. 5 illustrates a side view of a further example of a vibration dampening device in an equalised position;

FIG. 13C illustrates a front exploded view of the first section of FIG. 13A;

FIG. 13D illustrates a side exploded view of the first section of FIG. 13A;

DESCRIPTION OF EMBODIMENTS

Figure 1:
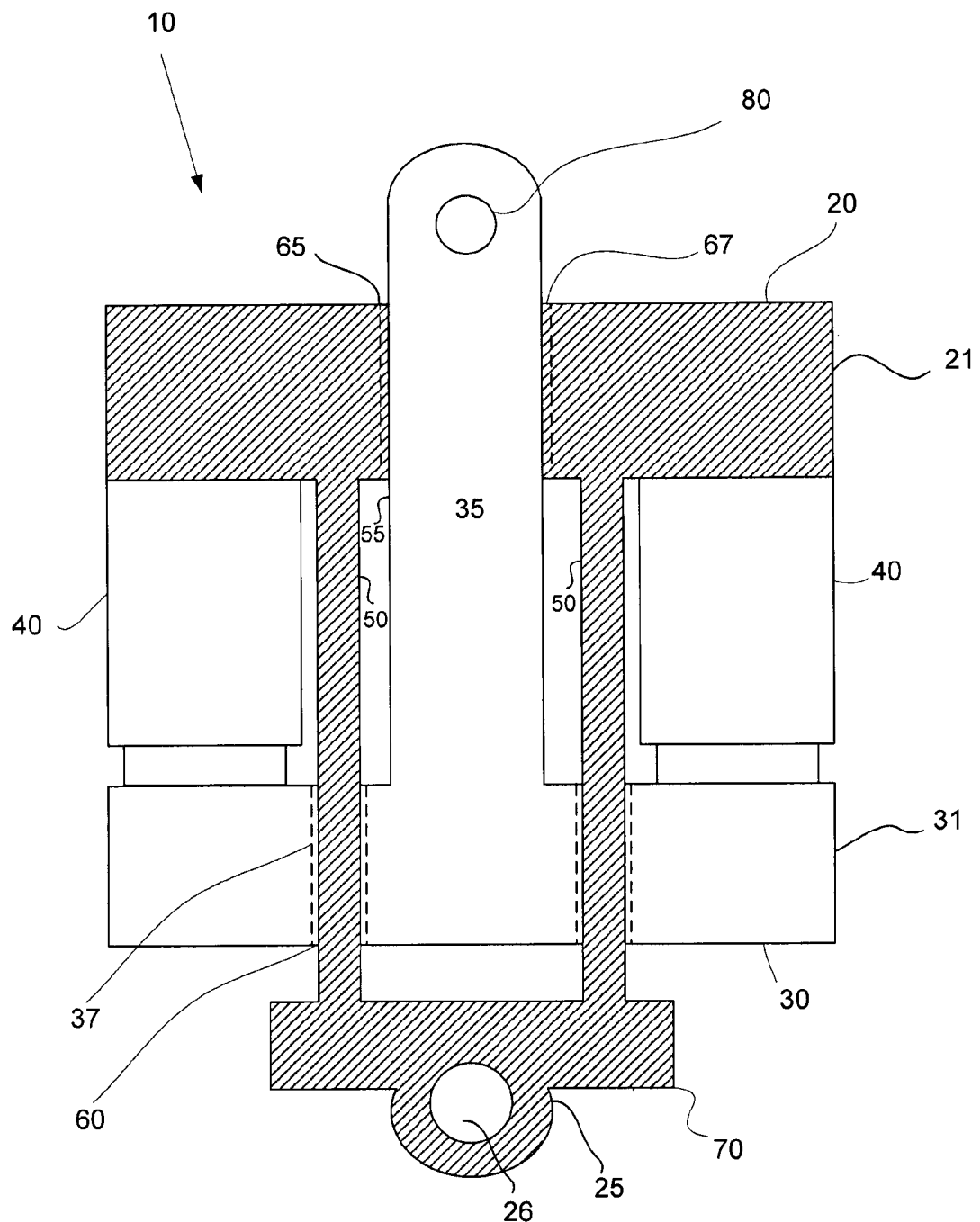
FIG. 1 illustrates a cross-sectional plan view of an example vibration dampening device.

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

Referring to FIG. 1 there is shown an example of a vibration dampening device 10. The vibration dampening device 10 includes a first section 20, a second section 30, and one or more fluid fillable absorbers 40. The first section 20 includes a first section support assembly 25 for supporting vibratory equipment 140 (see FIG. 3). The second section 30 includes a second section support assembly 35 for allowing the vibration dampening device 10 to be supported by a support apparatus 100 (see FIG. 3). The one or more fluid fillable absorbers 40 are located between the first section 20 and second section 30. The one or more fluid fillable absorbers 40 are configured to absorb at least a portion of a vibratory force transferred from operation of the vibratory equipment.

Advantageously, the vibration dampening device 10 intercepts and dampens vibratory forces via the compression of the one or more fluid fillable absorbers 40. This configuration is particularly successful at startup and shut down phases of operation of the vibratory equipment 140 where low-frequency vibratory forces are a significant proportion of the vibratory force transferred to the support apparatus 100. Furthermore, the vibratory force that is transferred to the support apparatus 140 during startup and shut down phases of operation of the vibratory equipment 140 is generally significantly greater than during normal operation. Thus, violent shaking of the support apparatus 100 is reduced during these phases utilising the vibration dampening device 10.

Figure 3:
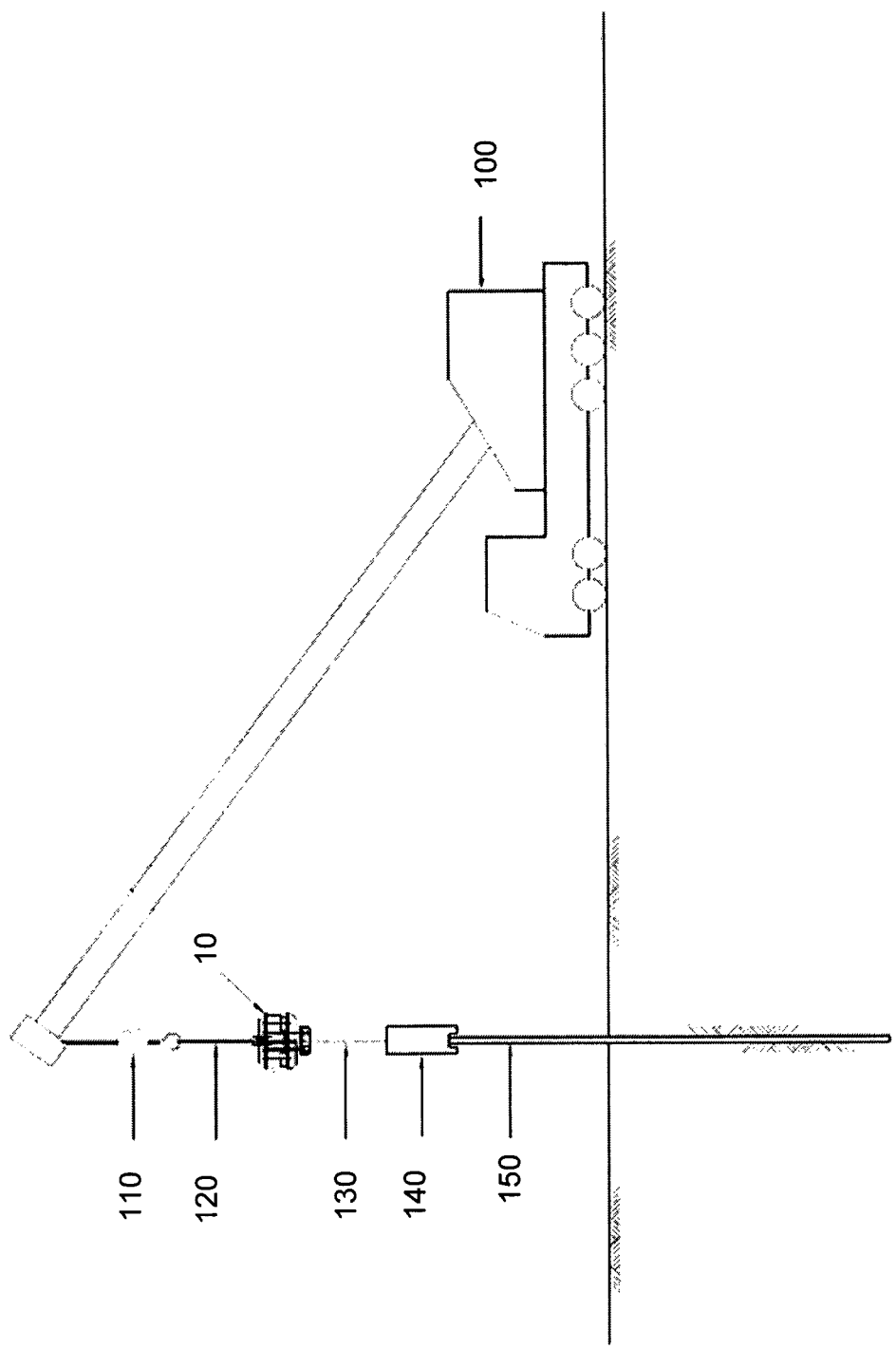
FIG. 3 illustrates a side view of an example of a crane supporting the vibration dampening device of FIG. 1 supporting a vibratory pile driver.

As shown in FIG. 3, the support apparatus 100 which supports the vibration dampening device 10 can be provided in the form of a crane 100. However, other forms of support apparatus can be used to support the vibration dampening device 10 such as an excavator or some other type of hoisting machinery. The vibratory equipment 140 coupled to the first section support assembly 25 can be provided in the form of a vibratory pile driver. However, other forms of vibratory equipment 140 can be used such as a vibratory hammer 140 or the like.

In use, the first and second sections 20, 30 are urged toward each other when a downward force is applied to the first section support assembly 25 via a lower sling 130. As the first and second sections 20, 30 are urged together, the first and second sections displace toward each other, thereby causing the one or more fluid fillable absorbers 40 to compress and at least partially absorb the vibratory force. The partial absorption of the urging force by the one or more fluid fillable absorbers 40 reduces the vibratory force transferred to the support apparatus 100 via an upper sling 120.

Referring more specifically to FIG. 1, the first section 20 can include a first section plate 21 and the second section 30 can include a second section plate 31. The first section plate 21 includes a first section aperture 65 located in a central position thereof. The second section plate 31 includes a plurality of second section apertures 60 located radially thereabout.

The first section support assembly 25 can include a plurality of first section support arm 50 that are connected to the first section 20 and extend downwardly therefrom. The first section support arm 50 are located radially about the first section aperture and are spatially distributed evenly. A portion of each first section support arm 50 protrudes through a respective one of the second section apertures 60 provided in the second section plate 21. Each second section aperture 60 may include a substantially frictionless bush 37 on the inner surface thereof, such as a Teflon insert, to reduce friction between the first section support arms 50 and the second section plate 31 during operation.

The protruded portions of the first section support arms 50 connect to a stop member 70 which rests under the second section plate 31 to restrict the second section 30 and the first section 20 separating via withdrawal of the first section support arms 50 from the second section plate 31. The stop member 70 may be releasably attached to the first section support arms 50 via coupling elements. For example, each first section support arm 50 may includes a screw thread to allow for threaded element to be coupled thereto. The stop member may be a coupling plate 70 which is releasably secured under the second section plate 31. Alternatively, it will be appreciated the first section support arms 50 can be fixed permanently to the stop member 70.

The first section support assembly 25 includes a first section coupling element 26 for coupling the lower sling 130 to the first section support assembly 25. In particular, the first section coupling element 26 is provided in the form of a lug or eyelet which can extend from the stop member 70.

The second support assembly 35 includes a second support arm 55 that is centrally located on the second section plate 31 and extends substantially perpendicularly therefrom. Whilst the second section support arm 35 is shown for clarity purposes having a beam-like profile in FIG. 1, the second section support arm 55 can have a tapered profile wherein a widened area is provided in contact with the second section plate 31 and tapers away as it extends from the second section plate 31.

A portion of the second section support arm 55 protrudes through the first section aperture 65 located centrally in the first section plate 20. The second support assembly 35 includes a second section coupling element 80 for coupling the upper sling 120 to the second section support assembly 35. The second section coupling element 80 is provided in the form of a lug or eyelet which can extend from the second section support arm 55.

Whilst it is shown in FIGS. 1 to 6 that the vibration dampening device 10 includes a single second section support arm 55 that protrudes upwardly from the second section plate 31, in another variation, a plurality of second section support arms 55 can extend upwardly from the second section plate 31 and protrude through the first section plate 21 similarly to the configuration used for the first section support arms 50 but in a reverse arrangement. The first section aperture 25 may include a substantially frictionless bush 67 on the inner surface thereof, such as a Teflon insert, to reduce friction between the second section support arm 55 and the first section plate 21 during operation.

Figure 2:
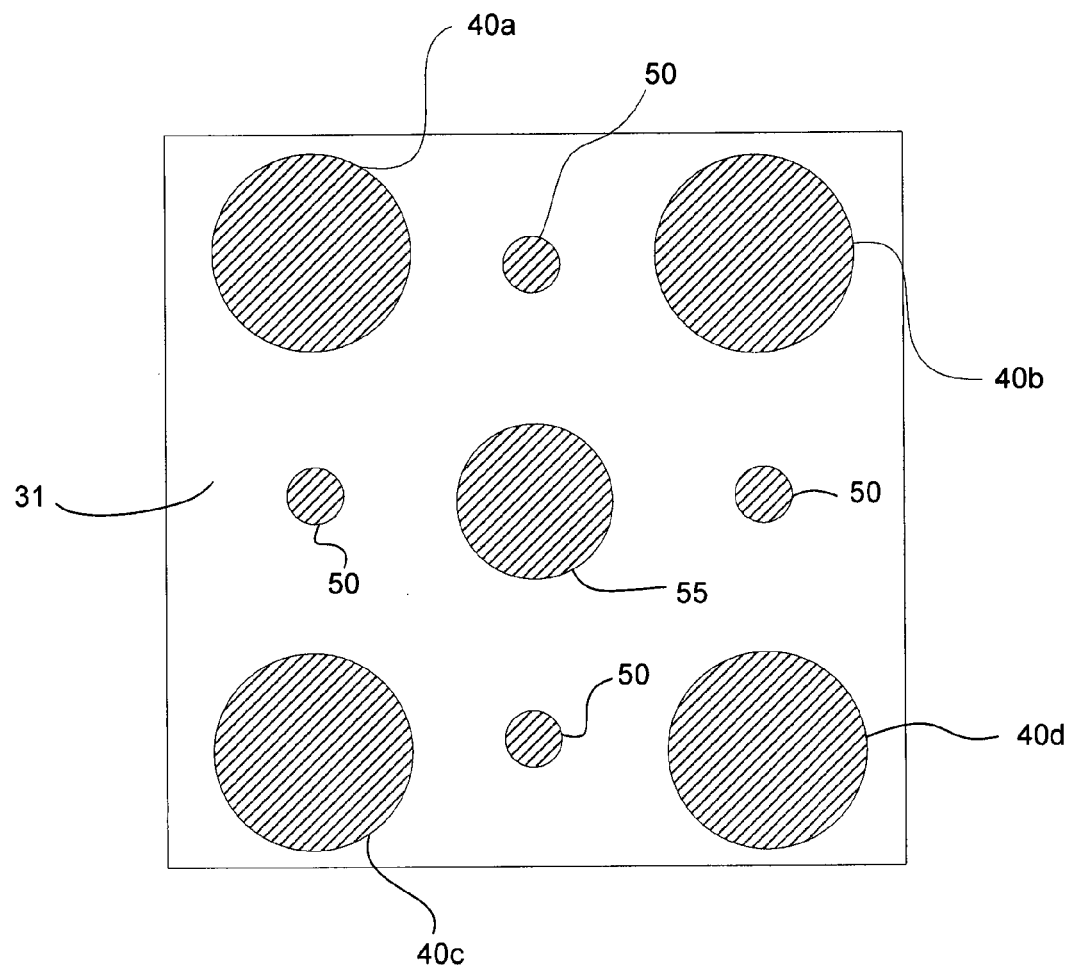
FIG. 2 illustrates a horizontal cross-sectional view of the vibration dampening device of FIG. 1.

As shown in FIG. 2, the first section support arms 50 are distributed evenly and radially about the first section plate 21, and the second section support arm 55 is located centrally on the second section plate 31. As shown in FIG. 2, the first section support arms 50 are located between adjacent fluid finable absorbers 40a, 40b, 40c, 40d which extend between the first section plate 21 and the second section plate 31.

Figure 7:
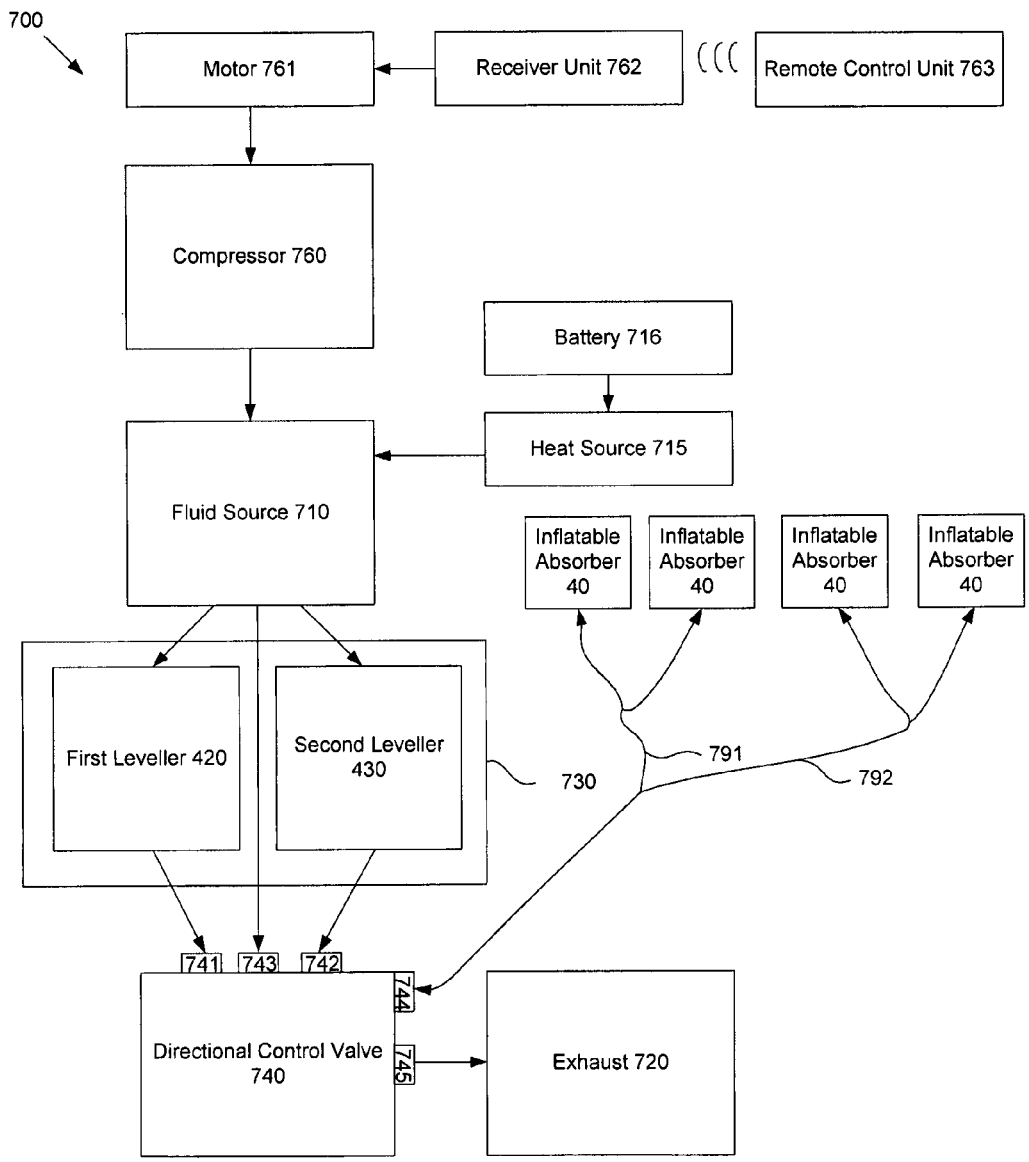
FIG. 7 illustrates a block diagram of a plumbing arrangement for the vibration dampening device.

Referring to FIG. 7, the one or more fluid fillable absorbers 40 are in fluid communication with a fluid source 710 so as to be able to at least partially supply and at least partially fill the one or more fluid fillable absorbers 70 with fluid. The vibration dampening device includes a fluid control system 740 which controls the supply of fluid to and from the one or more fluid fillable absorbers.

The fluid source 710 is preferably a gas source, such as a pressurised gas supply, wherein the fluid fillable absorbers 40 are inflatable with pressurised gas. The pressurised fluid source can be provided in the form of a pressurised fluid reservoir, such as a pressurised air tank, which can be supported on the device 10, such on an upper surface of the first section 20.

The fluid source 710 can be in fluid communication with a compressor 760 to resupply fluid to the fluid source 710 when fluid is distributed to the fluid fillable absorbers 40. The compressor may be operably connected to a motor 761, such as a diesel motor. The fluid source 710, compressor 760 and or motor 761 can be supported upon the vibration dampening device 10. Due to the device 10 being able to operate on air pressure only, the device is safe in areas where electrical systems may be hazardous. Additionally the expulsion of air is environmentally advantageous. It will be appreciated that other forms of fluid can be used such as a hydraulic liquid, however gas has been found advantageous for particular applications, particularly due to the relatively light weight of gas.

The vibration dampening device 10 can include a displacement feedback assembly 730 for detecting displacement between the first and second section plates 21, 31 and for maintaining the separation of the first and second sections 21, 31 to a particular defined spacing. The defined spacing can generally be defined as a preferred ride level of the fluid fillable absorbers 40.

The displacement feedback assembly 730 is operatively connected to the fluid source 710 to selectively supply fluid from the fluid source 710 to maintain the separation between the first and second section plates 21, 31 in the event that the first and second section plates 21, 31 are displaced toward each other. The displacement feedback assembly 730 can be also operatively connected to the exhaust assembly 720, wherein in the event that the displacement feedback assembly 730 detects that the second section plate 31 has been displaced away from the first section plate 21, the exhaust assembly 720 is actuated to allow fluid to be expelled from the one or more fluid fillable absorbers 40.

Figure 4:
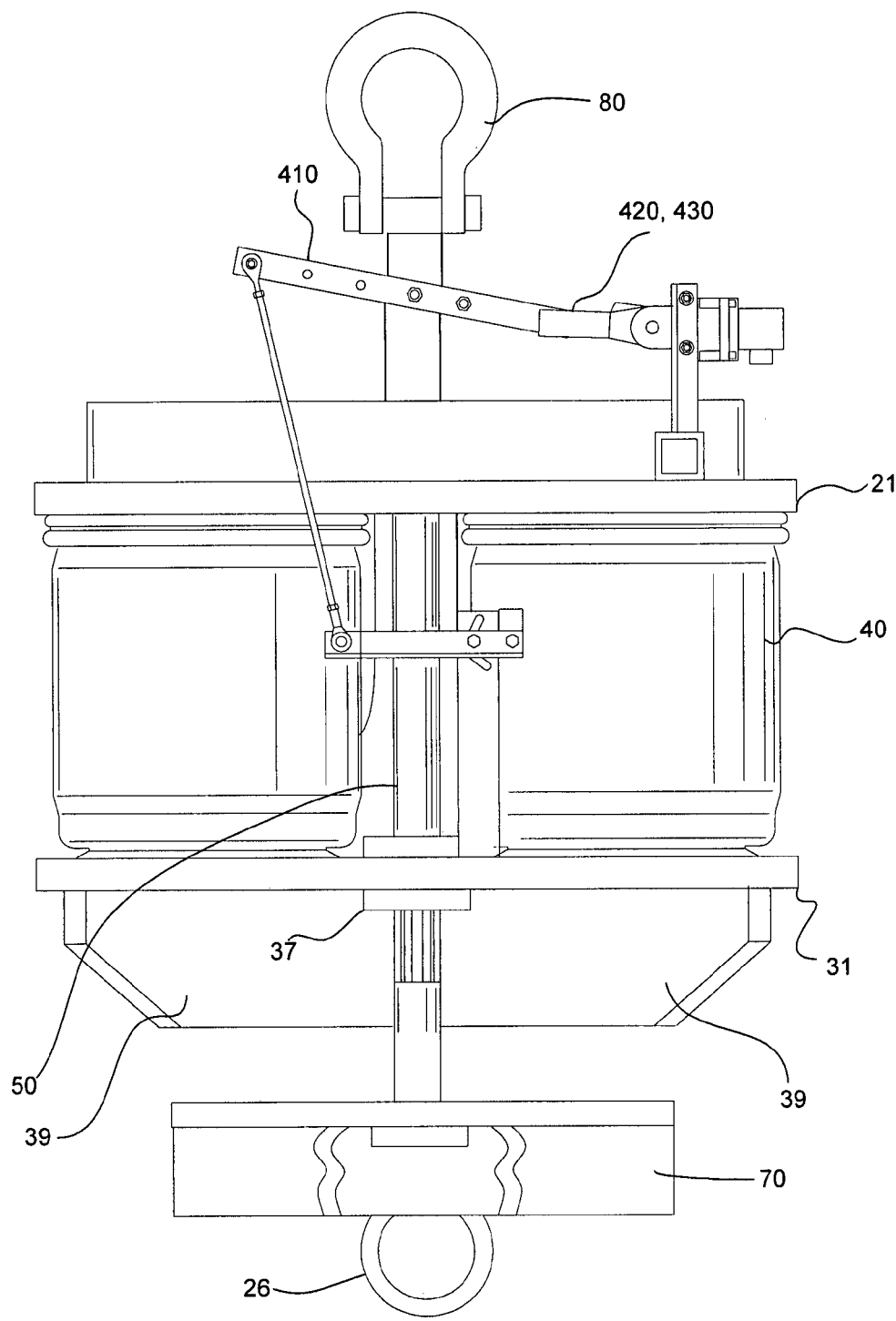
Figure 5:
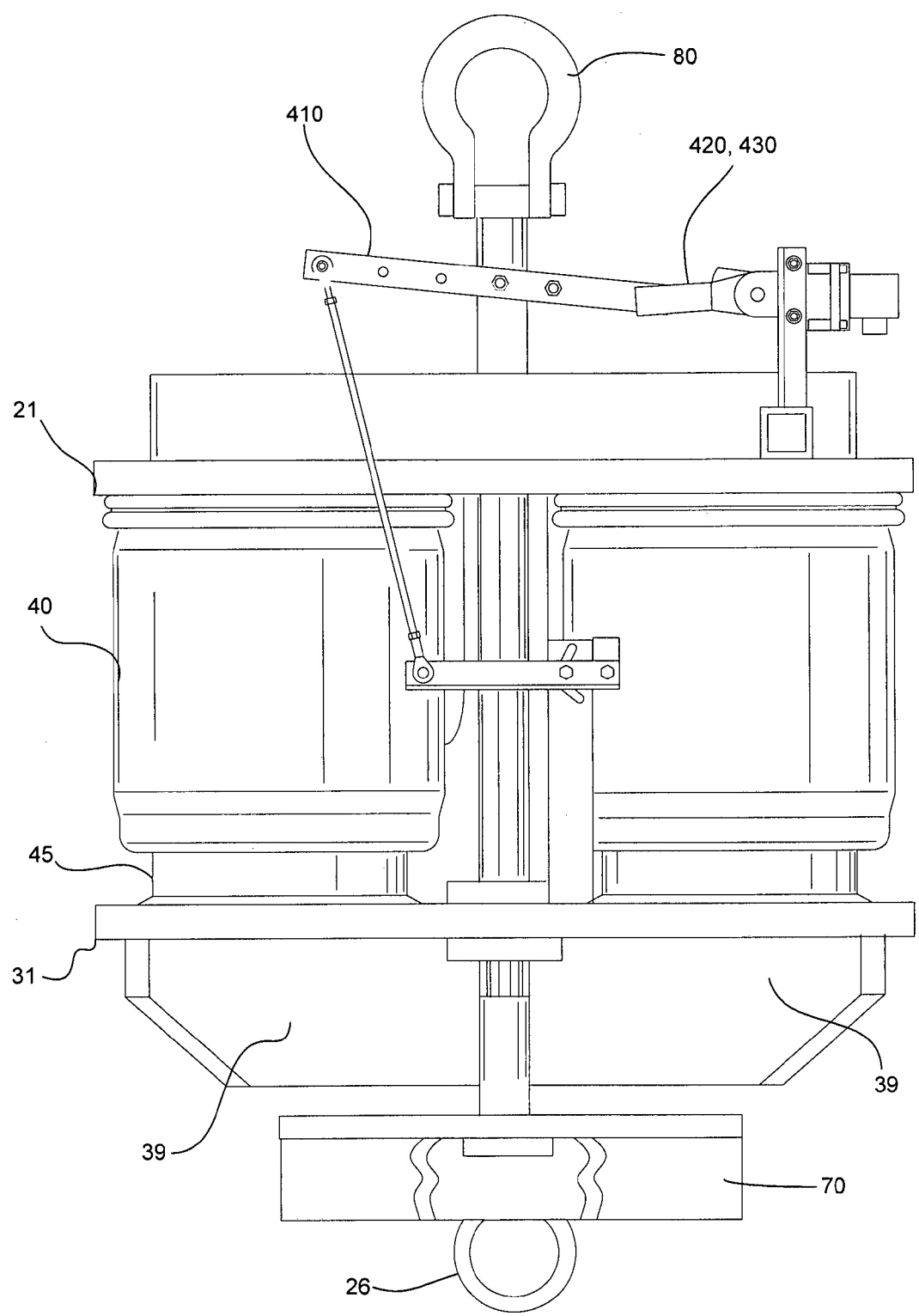
FIG. 5 illustrates a side view of a further example of a vibration dampening device, wherein the first and second section plates are displaced toward each other.
Figure 6:
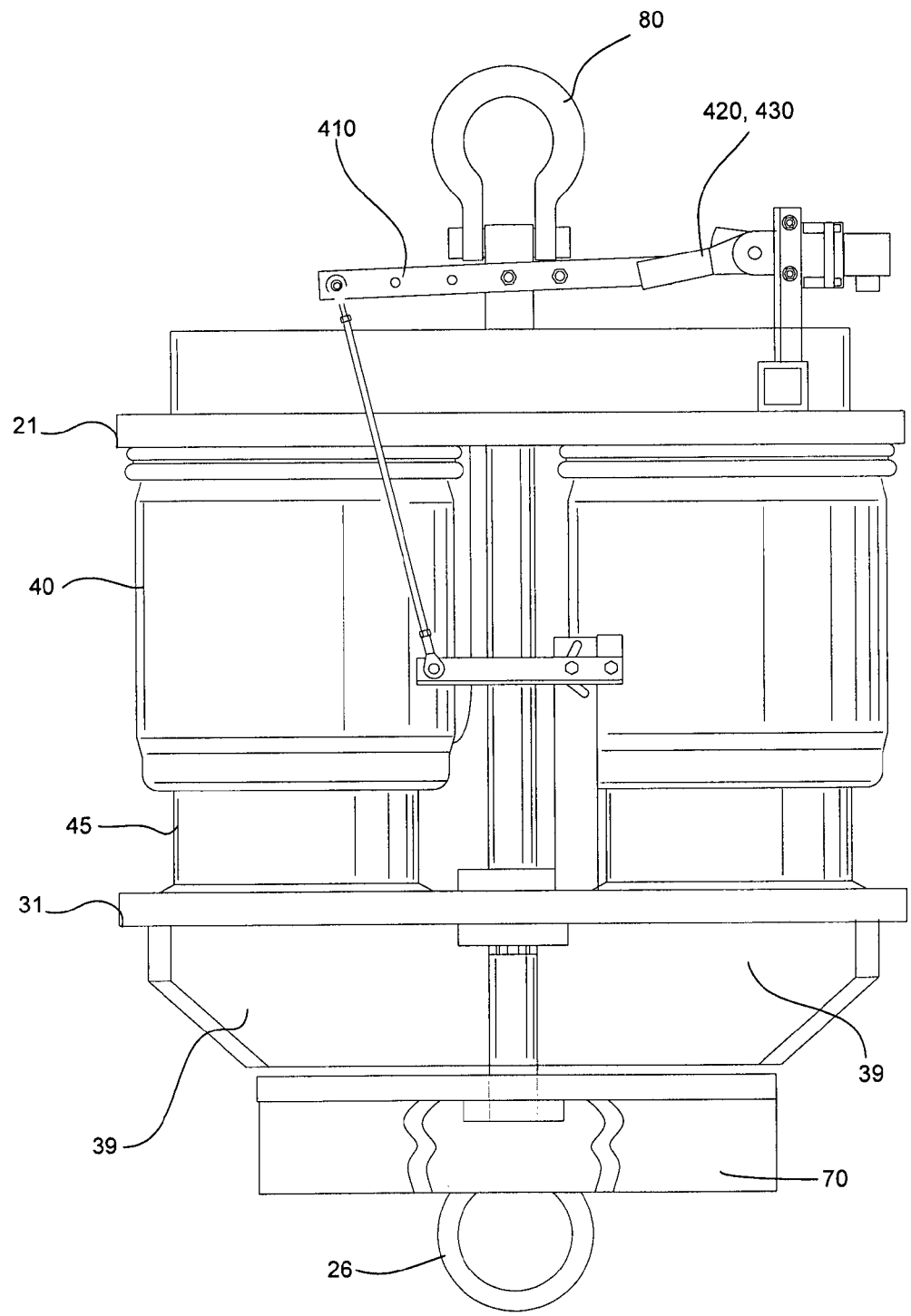
FIG. 6 illustrates a side view of the vibration dampening device of FIG. 4, wherein the first and second sections are displaced away from each other.

Referring to FIGS. 4 to 6 there is shown a plurality of positions that the device 10 can be moved between.

In particular, FIG. 5 illustrates the device 10 in a equalised position wherein the force being applied to the first and second section support assemblies 25, 35 is balanced by the force being applied by the pressure in the fluid fillable absorbers 40.

FIG. 4 illustrates the situation where the force being applied to the first and second section support assemblies 25, 35 is greater than the pressure being exerted by the fluid fillable absorbers 40. In this position, the device is in a compressed position. The displacement feedback assembly 730 detects this imbalance of forces via the displacement of the first and second section plates 21, 31 toward each other, and actuates the fluid supply to at least partially fill the fluid finable absorbers 40 to return the device to the equalised position as shown in FIG. 5.

FIG. 6 illustrates the situation where the force being applied to the first and second section support assemblies 25, 35 is less than the pressure being exerted by the fluid fillable absorbers 40. In this illustration, the device is in an expanded position. The displacement feedback assembly 730 detects this imbalance of forces via the displacement of the first and second section plates 21, 31 away from each other, and actuates the exhaust assembly to expel fluid from the fluid fillable absorbers 40 to return the device 10 to the equalised position as shown in FIG. 5.

The displacement feedback assembly 730 can be constructed using many configurations. Referring to FIGS. 4 to 6, there is shown by example a specific mechanical arrangement for the displacement feedback assembly 730 that includes an arm member 410, a first leveller 420, and a second leveller 430.

The arm member 410 is operatively coupled, at a first end, to the second section plate 31. The first leveller 420 is operatively coupled to a second end of the arm member 410 and the fluid source 710, wherein the first leveller is actuable by displacement of the arm member 410 when the second section 30 is displaced toward the first section 20 as shown in FIG. 4. Actuation of the first leveller 420 causes the supply of fluid from the fluid source 710 to the one or more fluid fillable absorbers 40, thus returning the first and second section plates 21, 31 to the predetermined spacing therebetween as shown in FIG. 5.

The second leveller 430 is operatively coupled to the second end of the arm member 410 and the fluid source 710, wherein the second leveller 430 is actuable by displacement of the arm member 410 when the second member 30 is displaced away from the first section, plate 21 as shown in FIG. 6. Actuation of the second leveller 430 causes the expulsion of fluid from the one or more fluid fillable absorbers 40 via the exhaust assembly 720 to thereby return the first and second section plates 21, 31 to the predetermined spacing therebetween as shown in FIG. 5.

Referring to FIG. 7, the displacement feedback assembly 730 can be operatively connected to the fluid control system 740. The fluid control system can be provided in the form of a directional control valve unit 740. The directional control valve unit 740 includes a plurality of ports 746. In particular, the directional control valve unit 740 includes a first port 741 in fluid communication with the first leveller 420, a second port 742 in fluid communication with the second leveller 430, a third port 743 in fluid communication with the fluid source 710, a fourth port 744 in fluid communication with the fluid fillable absorbers 40, a fifth port 745 in fluid communication with the exhaust assembly 720. The fifth port 745 can simply be an exhaust vent.

The directional control valve unit 740 is configured to allow supply of fluid from the fluid source 710 to the one or more fluid fillable absorbers 40, or to expel fluid from the fluid fillable absorbers 40 via the exhaust assembly 720, based upon whether the first or second leveller 420, 430 is actuated. The directional control valve unit 740 includes a plurality of control elements associated with respective ports 746 which detect fluid being provided thereto wherein the actuation of one of the control elements 747 at a respective port 746 results in opening and/or closing one or more valves at one or more ports 746 of the directional control valve unit 740.

In the event that the control element 747 at the first port 741 is actuated via fluid supply from actuation of the first leveller 420, the directional control valve unit 740 actuates valves at the third and fourth port 743, 744, allowing fluid to be supplied from the fluid source 710 to the one or more fluid fillable absorbers 40.

Alternatively, in the event that the control element 747 at the second port 742 is actuated via fluid supply from actuation of the second leveller 430, the directional control valve unit 740 actuates valves at the fourth and fifth ports 744, 745, allowing fluid to be expelled from the fluid fillable absorbers 40 via the exhaust assembly 720.

As shown in FIG. 7 by a double headed arrow, the fluid transfer line between the directional control valve unit 740 and the fluid fillable absorbers 40 is via one or more bidirectional fluid transfer lines. As such, fluid can transfer from the fluid source 710 to the fluid fillable absorbers 40, via the directional control valve unit 740, using the same fluid transfer line that is used to expel fluid from the fluid fillable absorbers 40 to the exhaust vent 720, via the directional control valve unit 740.

It will be appreciated that the displacement feedback assembly 730 described above is a mechanical type arrangement which is advantageous due to the type of vibrational forces that are being exerted on the device. Whilst the displacement feedback assembly 730 described above is based on a mechanical arrangement to detect displacement between the first and second section plates 21, 31, other arrangements can be utilised.

In particular, one or more electronic sensors (not shown), such as a laser or an ultrasonic sensor, can be used to detect displacement of the first section plate 21 toward or away from the second section plate 31. The one or more electronic sensors can be used as input to an electromechanical directional control valve, wherein depending upon the electrical input from the one or more electronic sensors indicative of the displacement of the first section plate 21 toward or away from the second section plate 31 relative to a displacement threshold, the supply of fluid or expulsion of fluid is actuated by the electromechanical directional control valve. Other arrangements for the displacement feedback assembly 730 are also possible.

Referring to FIGS. 4 to 6, the one or more fluid fillable vibratory force absorbers 40 can be provided in the form of inflatable absorbers such as air bags, specifically truck suspension air bags, which use a rolling-lobe and piston configuration 45. When fluid is supplied to the air bags 40, the air bags 40 extend substantially perpendicularly to the first and second sections 20, 30, as shown in FIG. 5 and more predominately in FIG. 6, to urge the first and second section plates 21, 31 apart.

When fluid is expelled from the air bags 40, the air bags 40 allow the first and second section plates 21, 31 to move toward each other, as shown in FIG. 4. In one form, the second section plate 31 includes a plurality of legs that extend upwardly from the second section plate 31. The legs support the first section plate 21 above the second section plate 31 a particular distance when the fluid fillable absorbers 40 are substantially empty and cannot support the first section 20. In particular, an underside surface of the first section plate 21 rests against a foot of each leg when the fluid fillable absorbers 40 are substantially empty. It will be appreciated that a reverse arrangement can be utilised wherein the legs downwardly extend from the first section plate 21 and rest against an upper surface of the second section plate 31 when the fluid fillable absorbers 40 are substantially empty and cannot support the first section plate 21.

Figure 8:
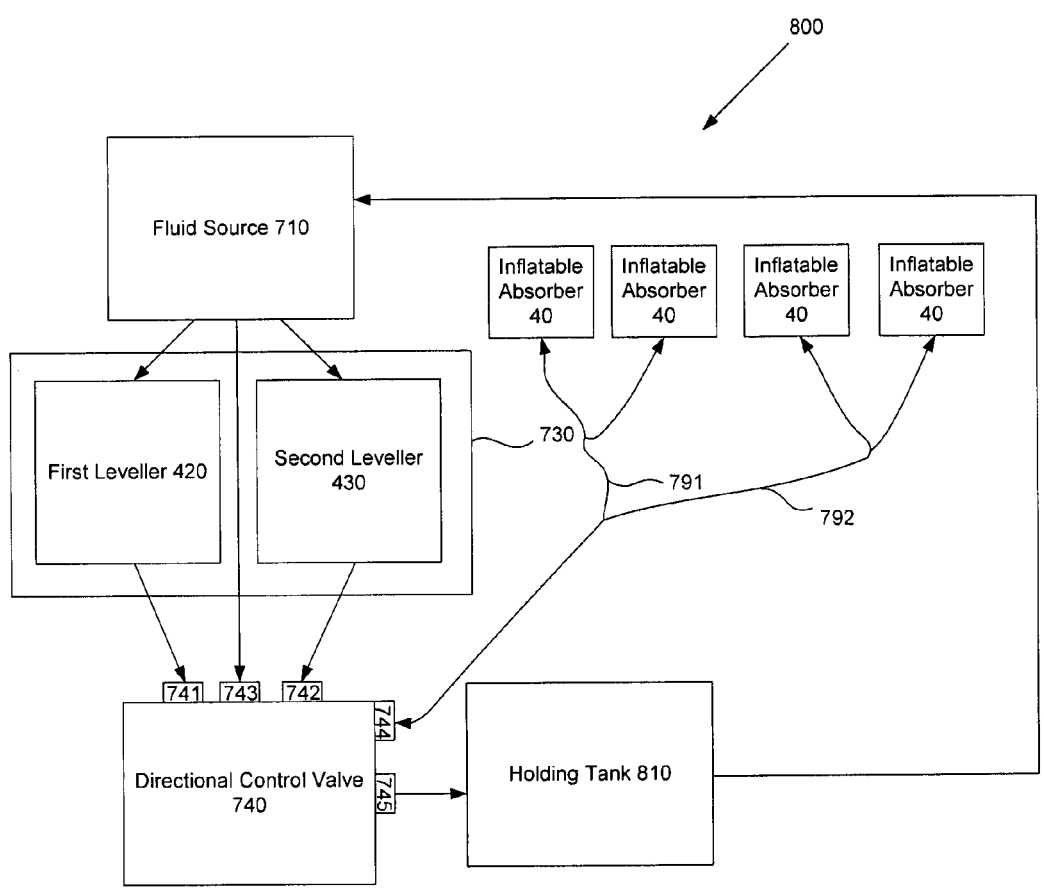
FIG. 8 illustrates a block diagram of an alternate plumbing arrangement for the vibration dampening device.

In one optional embodiment 800 as shown in FIG. 8, the fluid expelled from the fluid finable absorbers 40 can be expelled into a holding tank 810 in fluid communication with the exhaust assembly 720. The holding tank 810 is in fluid communication with the fluid source 710, wherein the fluid is recycled by communicating this expelled fluid back into the fluid source 710 for supplying the one or more fluid fillable absorbers 40.

The holding tank 810 includes a pair of one-way valves to restrict fluid flowing in from the fluid source 710 and fluid flowing out to the fluid fillable absorbers 40. The holding tank 810 may pressurise the fluid which flows into the holding tank 810 prior to transferring the pressurised fluid back to the fluid source 710 for resupply to the fluid fillable absorbers 40 when required. This optional embodiment 800 thereby reduces the expulsion of fluid to the external environment. In the event that temperature of the environment lowers, the fluid source 710 may need to be topped up with further fluid to adequately provide a sufficient amount of fluid pressure to the one or more fluid fillable absorbers 40. In the event that the temperature of the environment increases, there may be an increase in the fluid pressure in the system 810, wherein a blow-off valve (not shown) may be automatically actuated to expel fluid from the holding tank, fluid source 710, or the exhaust assembly 720.

Figure 16:
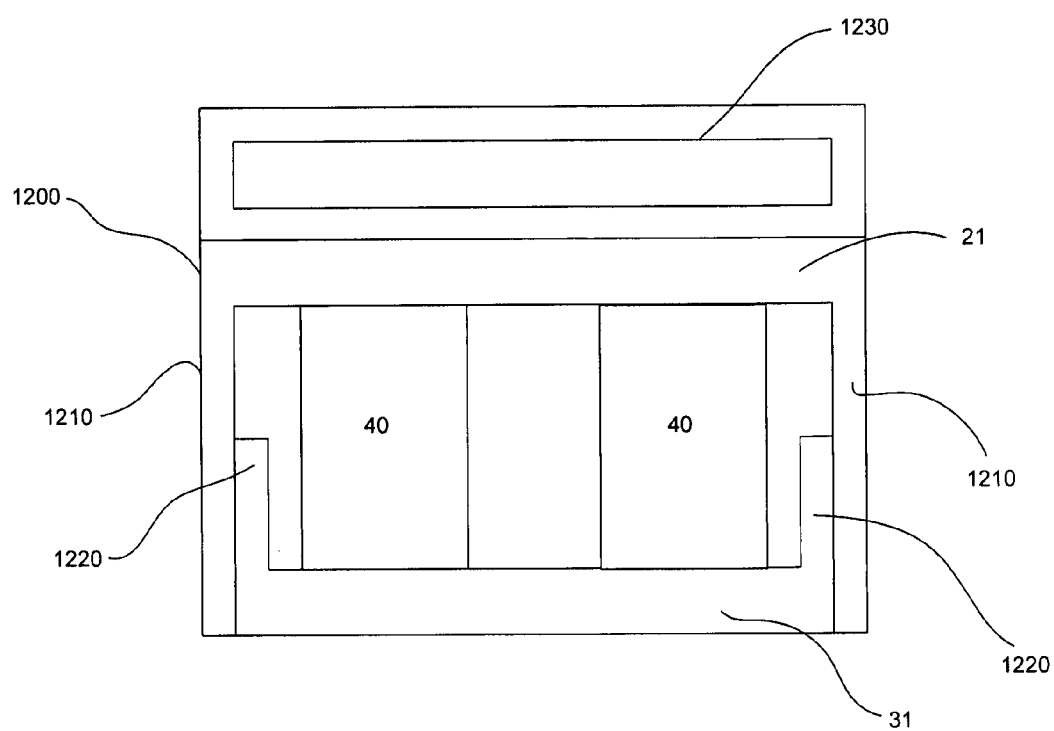
FIG. 16 illustrates a cross-sectional view of another example of a vibration dampening device including a casing.

The device 10 can include a casing 1200 as shown in FIG. 16. The casing can restrict an external object, such as a user's appendage being placed between the first and second section plates 21, 31. In one form, the casing 1200 may surround at least a portion of the first and second section plates 21, 31.

Referring more specifically to FIG. 16, the first section plate 21 includes first walls 1210 extending orthogonally from edges thereof toward the second section plate 31. Similarly, the second section plate 31 includes second walls 1220 extending orthogonally from edges thereof toward the first section plate 21. The first and second walls 1210, 1210 are arranged in an overlapping arrangement such that telescopic movement occurs between the first and second walls 1210, 1220 as displacement occurs between the first and second sections 20, 30 in use. The walls can be made from the same material as the first and second plates 21, 31, such as polyethylene. The casing can include a cavity 1230 located above the first section 20 which can house various components of the vibration dampening device, such as the fluid supply 710, the compressor 760 and the motor 761.

In an alternative, the casing may be provided in the form of a baffle, in particular a concertinaed baffle, which extends between the edges of the first and second section plates 21, 31 to surround the sides of the device 10.

In a preferable form, a substantially constant fluid pressure is to be provided by the fluid source 710 when actuated to supply fluid to the fluid fillable absorbers 40. A selectable control valve may be provided with the fluid source 710 to selectively adjust and control the fluid supplied to the fluid fillable absorbers 40. In one form, the fluid source 710 is provided between a pressure range of 90 psi to 110 psi, and more preferably 100 psi. When fluid is provided to the fluid fillable absorbers 40, the fluid source 710 increases the volume of fluid provided in the fluid fillable absorbers 40 at a constant pressure until the displacement feedback assembly detects that the displacement between the first and second section plates 21, 31 is satisfactory.

As shown in FIGS. 2, 7 and 8, four fluid fillable absorbers 40 can be used. In one variation, different fluid flow rates may be provided to at least some of the fluid fillable absorbers 40 to absorb varying frequency components of the vibratory force. In particular, each fluid fillable absorber 40 of a diagonal pairs of fluid fillable absorbers (i.e. 40*a* and 40*d* is a first diagonal pair, 40*b* and 40*c* is a second diagonal pair) can be supplied with the same fluid flow rate, however the fluid flow rate is different between the pairs of fluid fillable absorbers 40. As shown in FIGS. 7 and 8, two fluid transfer lines 791, 792 may supply fluid to and receive fluid from the fluid fillable absorbers 40. Each fluid transfer line 791, 792 transfers fluid to a respective pair of diagonally located fluid finable absorbers, however each fluid transfer line transfers the fluid at a different flow rate. For example, fluid transfer line 791 may supply and receive fluid in relation to fluid fillable absorbers 40*a* and 40*d* as shown in FIG. 2, and fluid transfer line 792 may supply and receive fluid in relation to fluid fillable absorbers 40b and 40c as shown in FIG. 2. Fluid transfer line 791 and 792 can be differently sized to allow for the variation in the flow rates between the respective fluid transfer lines 791, 792. The different fluid flow rates to and from the fluid fillable absorbers results in the fluid fillable absorbers 40 being able to at least partially fill and empty at different rates, thereby allowing for varying frequency components of the vibratory force to be absorbed.

Figure 9:
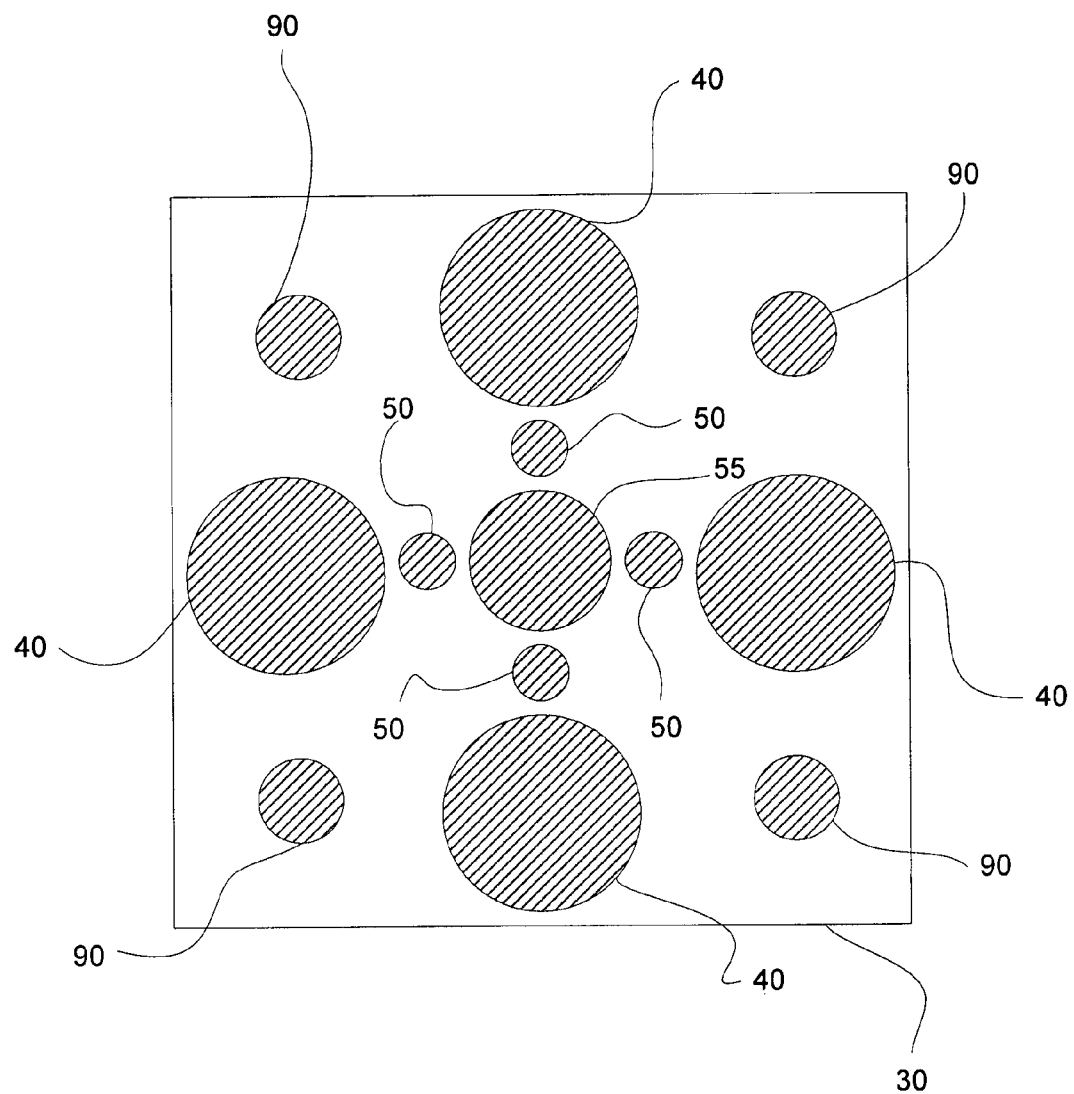
FIG. 9 illustrates a cross-sectional plan view of another example vibration dampening device.

In another variation, the vibration dampening device 10 can also include one or more mechanical vibration absorbers. In particular, referring to FIG. 9, the one or more mechanical vibration absorbers 90 may be provided in the form of shock absorbers which extend between the first and second section plates 21, 31. Additionally or alternatively, the one or more mechanical vibration absorbers 90 may be provided in the form of heavy duty springs which extend between the first and second section plates 21, 31.

In another variation, the fluid source 710 may be provided in the form of a compressor of the support apparatus 100. In particular, a number of support apparatuses 100 such as cranes and excavators include a hydraulic compressor that can be fluidly connected to the device 10 to at least partially fill the one or more fluid finable absorbers 40.

In a further variation, the vibration absorbing device 10 may be integrated within vibratory equipment 140. In this configuration, the vibration absorbing device 10 is integral with the vibratory equipment 140, thereby reducing the need for two separate pieces of equipment.

In a further variation, whilst the first and second sections 20, 30 can be made of steel, a polymer material can also be used to lighten the device 10. In particular, the polymer material can have a low coefficient of friction, such as Teflon. Not only is the device lighter, but advantageously due to the low coefficient of friction of the material which the first and second section is made of the need for substantially frictionless inserts for reducing the friction between the first and second support arms 50, 55 with the second and first section plates 21, 31 is not required.

In another variation, the vibration dampening device 10 can operate using a liquid rather than a gas, such hydraulic fluid. The air bags of the previous described embodiments may be substituted for a plurality of hydraulic vibration absorbers which are in fluid communication with a hydraulic accumulator, such as a pulse hydraulic accumulator.

As shown in FIGS. 4, 5 and 6, the underside surface of the second section plate 31 can include a number of ribs 39 that radially extend from a centre point thereof. The ribs form a diagonal arrangement on the underside surface of the second section plate 31. The ribs 39 can provide additional structural support for the second section plate 31.

Figure 10:
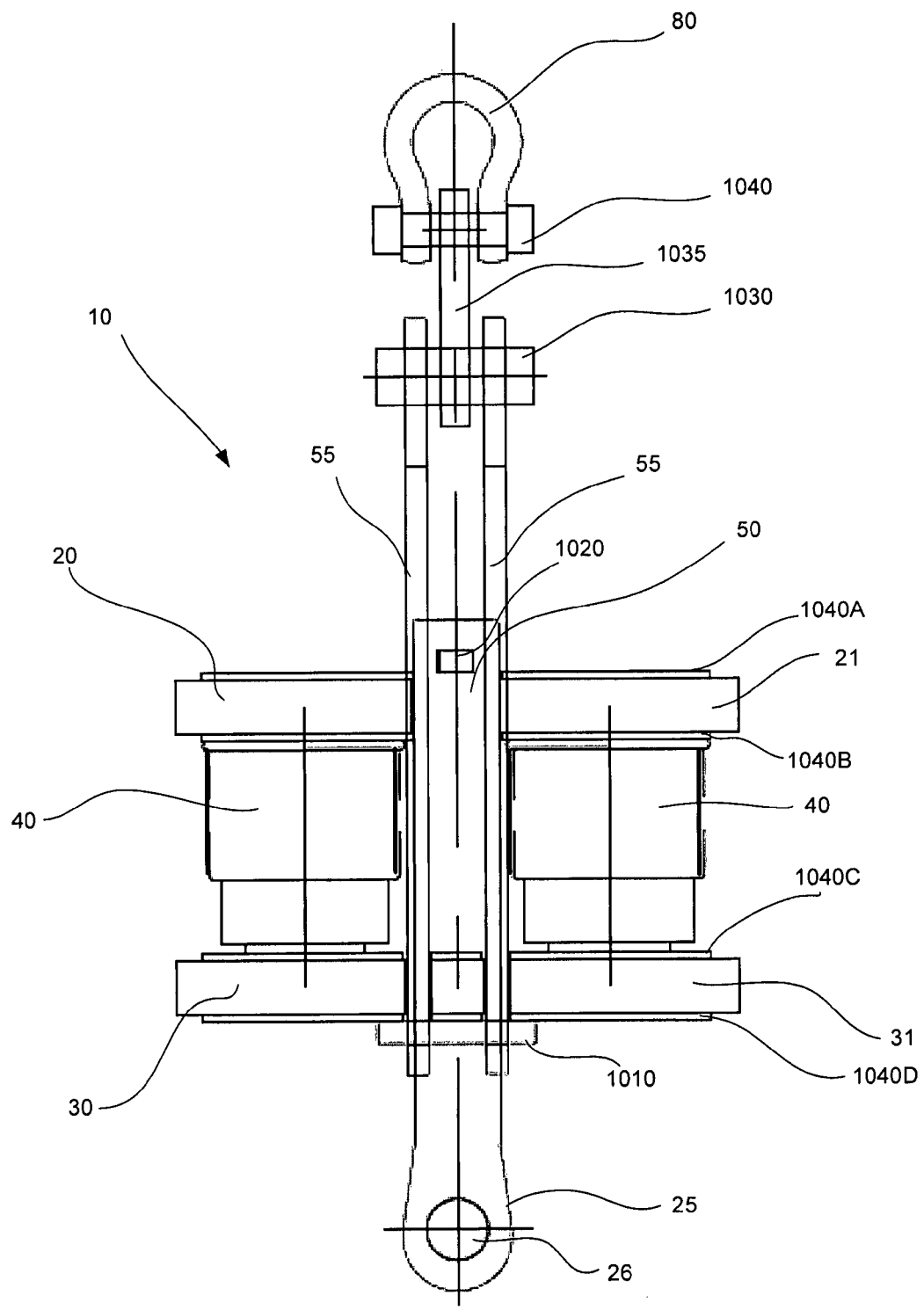
FIG. 10 illustrates a front view of another example of a vibration dampening device.
Figure 11:
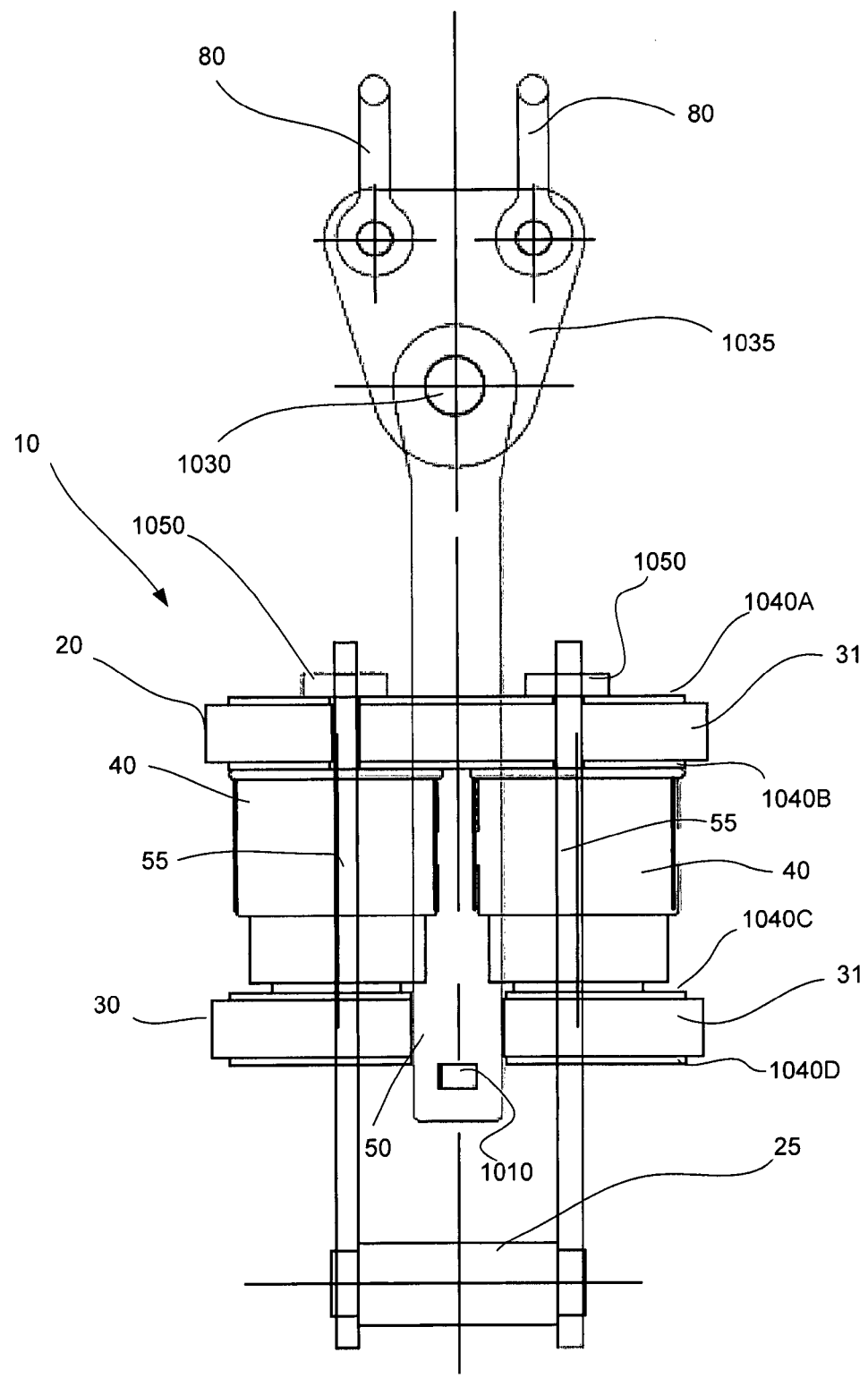
FIG. 11 illustrates a side view of the vibration dampening device of FIG. 10.

Referring to FIGS. 10 and 11 there is shown another example of the vibration dampening device 10. For clarity purposes, the displacement feedback assembly 730 has not been shown in the figures, however, it will be appreciated that the displacement feedback assembly 730 can be connected to the vibration dampening device 10 as previously discussed and shown in relation to FIGS. 4 to 6.

The first and second section plates 21, 31 are made from a polymer. In particular, the polymer is ultra high density polyethylene. The first section 20 includes an upper and lower rigid sheet 1040A, 1040B which is generally made from steel or similarly rigid material to provide additional strength. The polymer material of the first section plate 21 is sandwiched between the upper and lower sheets 1040A, 1040B.

Similarly, the second section plate includes an upper and lower sheet 1040C, 1040D. The second section 30 includes an upper and lower sheet 1040C, 1040D which is generally made from steel or similar to provide additional strength. The polymer second section plate 31 is sandwiched between the upper and lower plates 1040C, 1040D.

The first and second section 20, 30 in this example include no welded joints, but rather a number of keyed arrangements in order to reduce failures to welded components when under significant load.

Figure 12A:
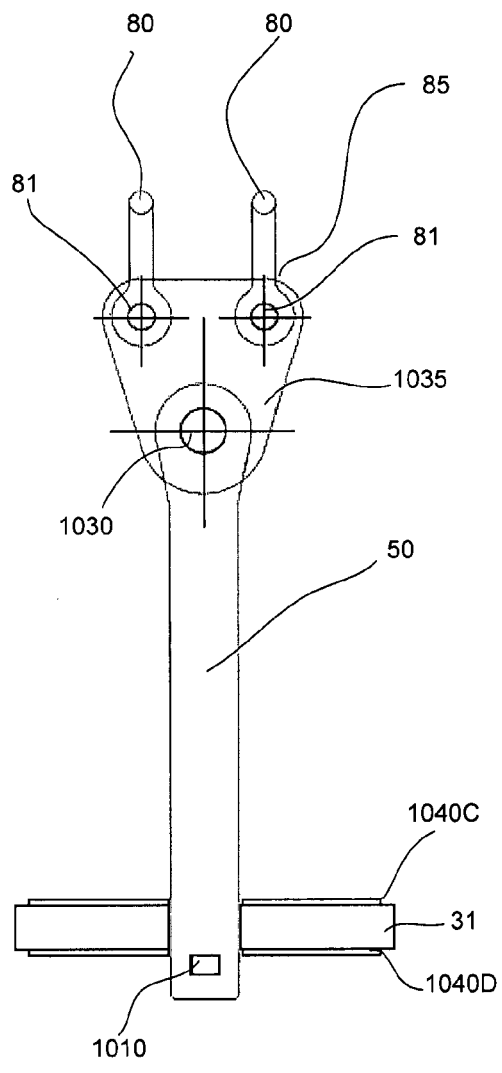
FIG. 12A illustrates a front view of the second section of the vibration dampening device of FIG. 10.
Figure 12B:
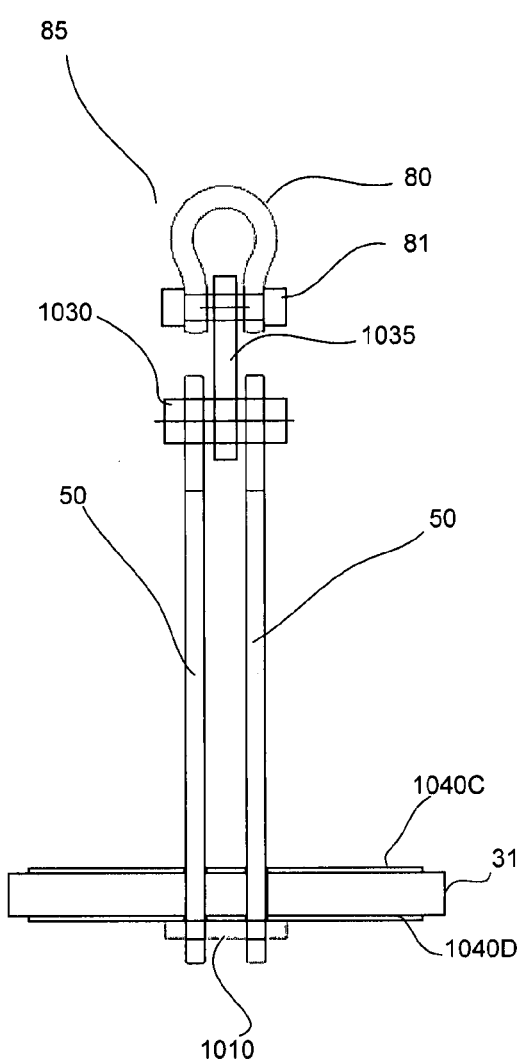
FIG. 12B illustrates a side view of the second section of FIG. 12A.
Figures 12C, 12D:
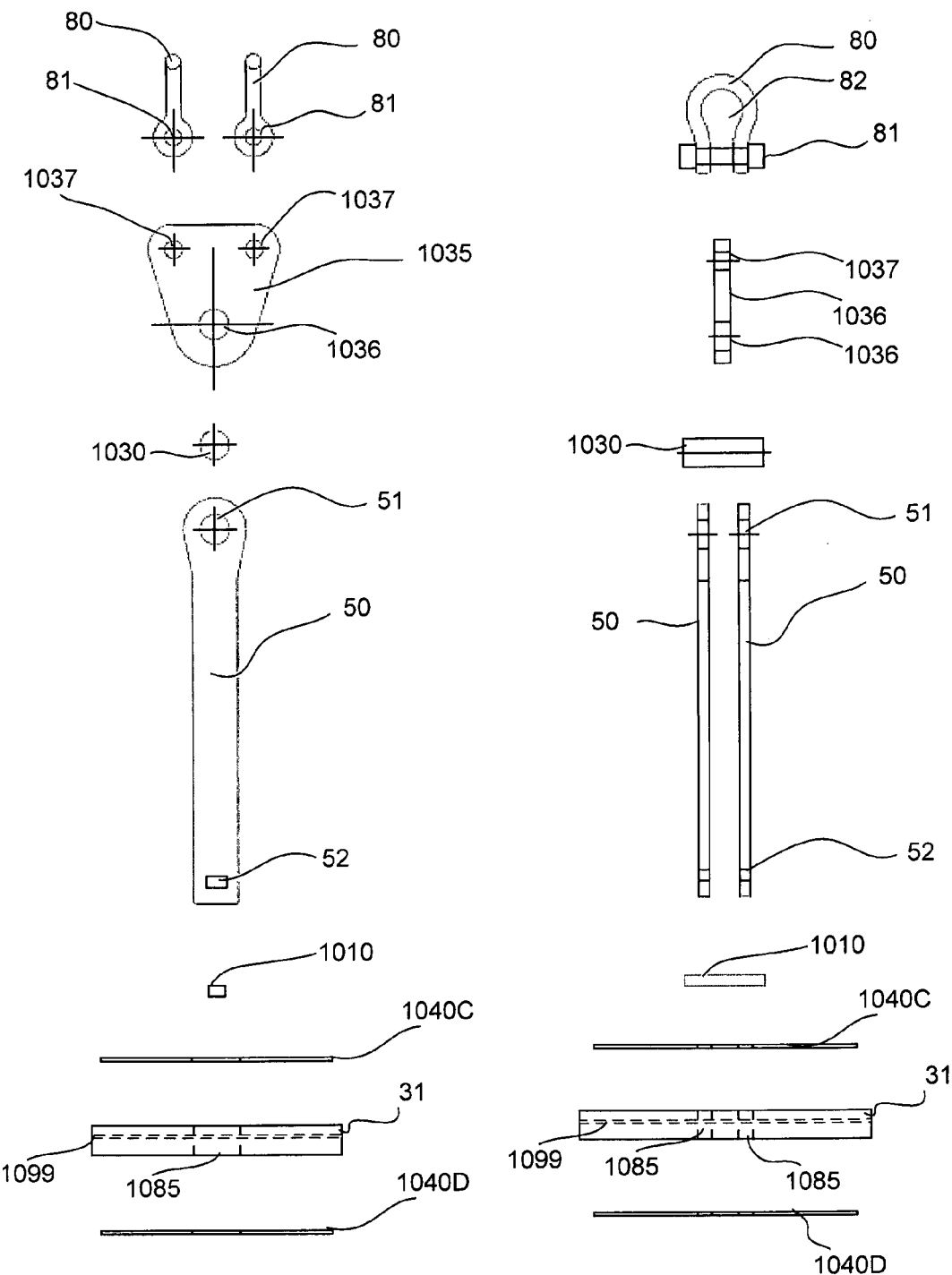
FIG. 12C illustrates a front exploded view of the second section of FIG. 12A.
FIG. 12D illustrates a side exploded view of the second section of FIG. 12A.

In particular, referring to the exploded view in FIGS. 12C and 12D, the second section 30 includes a plurality of second section support arms 50 that extend between a second section coupling arrangement 85 for attachment to the crane or the like and the second section plate 31. Each second section support arm 50 includes a first hole 51 and a second hole 52. A triangular lifting plate 1035 is placed between first ends of the second section support arms 50 and a lifting plate pin 1030 is received through the respective first holes 51 of the arms 50. A second end of the second section support arm 50 protrudes through a respective aperture in the second section plate 31 wherein a pin 1010 is located in the first hole 52 to prevent the second section support arm 50 being withdrawn therefrom. The first hole 52 Lifting eyelets 80 are coupled at apertures 1037 of the triangular lifting plate 1035. The coupling arrangement to the crane allows for swivelling movement in a first and second plane which are orthogonal to a longitudinal axis of the second section support arms 50.

Figure 13A:
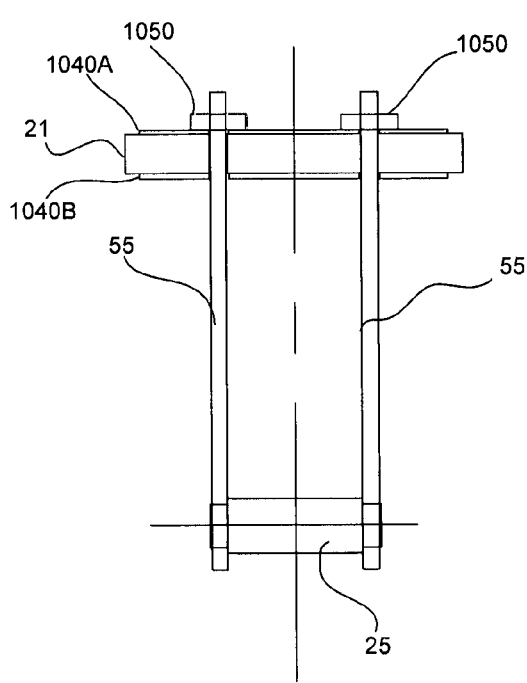
FIG. 13A illustrates a front view of the first section of the vibration dampening device of FIG. 10.
Figure 13B:
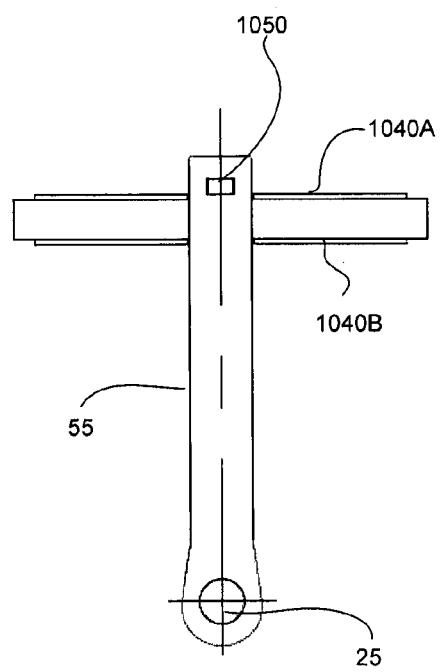
FIG. 13B illustrates a side view of the first second of FIG. 13A.

Similarly, referring to the exploded view in FIGS. 13C and 13D, the first section 21 includes a plurality of first section support arms 55 that extend between a first section coupling pin 25 for attachment to the vibratory equipment and the first section plate 21. Each first section support arm 55 includes a first hole 56 and a second hole 57. Each end 26 of the first section coupling pin 25 is received through a respective second hole 57 of the first section support arms. A first end of the first section support arm 55 protrudes through a respective aperture in the first section plate 21 wherein a pin 1010 is located in the first holes 52 to prevent the second section support arm 50 being withdrawn therefrom.

Figure 14:
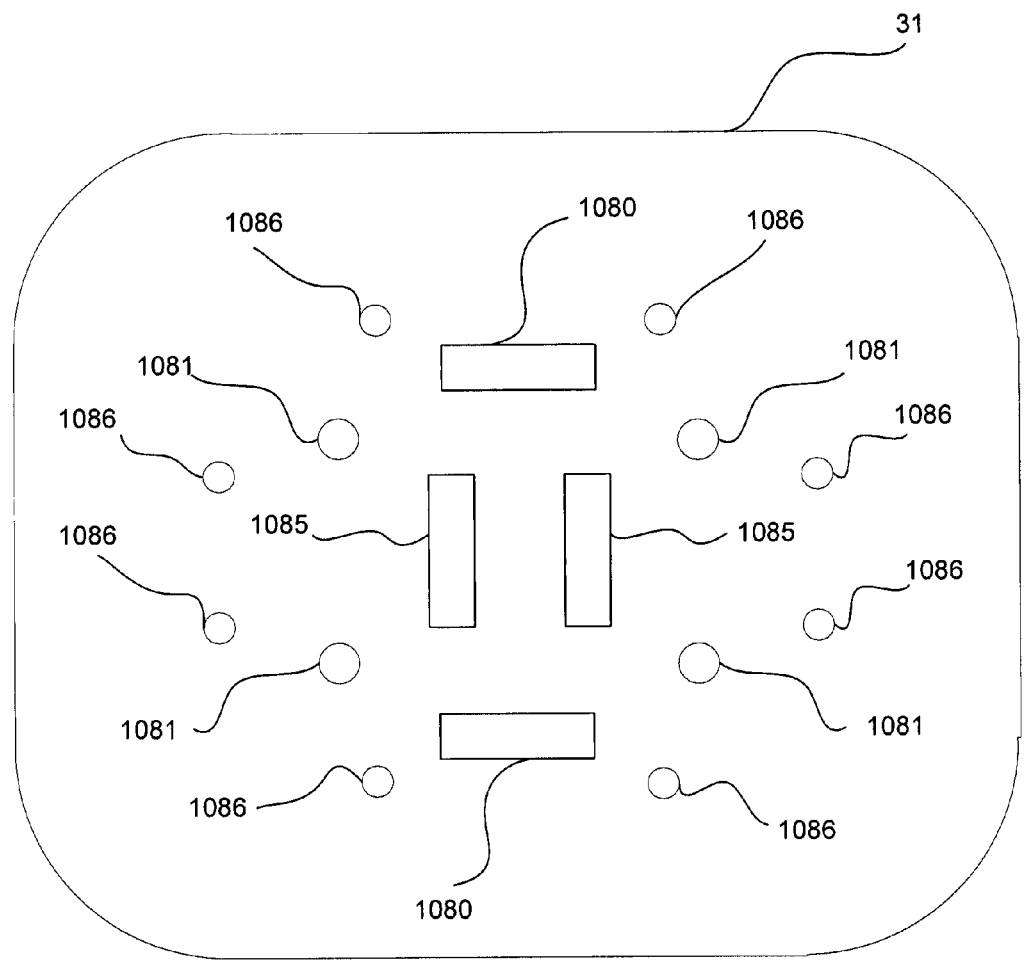
FIG. 14 illustrates a plan view of the second section plate of the vibration dampening device of FIG. 10.

As shown in FIG. 14, the second section plate 31 includes apertures 1080, 1085. Apertures 1080 are used to allow the first section support arms to pass through the second section plate 31 when displacement occurs between the first and second sections 20, 30. Apertures 1085 are used for securing, via keying, the second section support arms. Apertures 1081, 1086 are used for securing an underside of a respective fluid fillable absorber 40.

Figure 15:
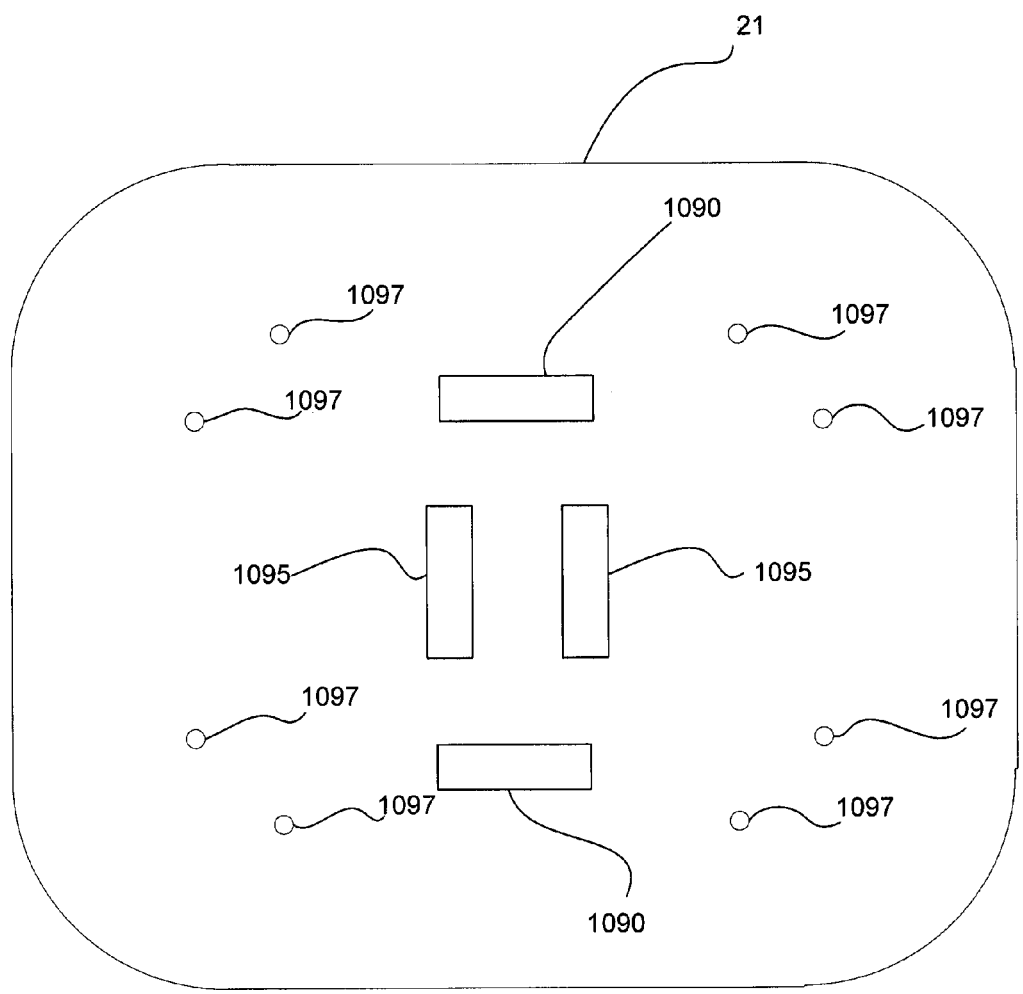
FIG. 15 illustrates a plan view of the first section plate of the vibration dampening device of FIG. 10.

Similarly, as shown in FIG. 15, the first section plate 21 includes apertures 1090, 1095. Apertures 1090 are used to allow the second section support arms to pass through the first section plate 21 when displacement occurs between the first and second sections 20, 30. Apertures 1095 are used for securing, via keying, the first section support arms. Apertures 1097 are used for securing an underside of a respective fluid fillable absorber 40.

In another variation, the vibration dampening device 10 can include a battery source 716 electrically connected to a heat source 715. The heat source 715 can be selectively activated to thermally heat the fluid supply 710 due to changes in environmental temperature which can effect pressure within the plumbing arrangement of the vibration dampening device 10. The vibration dampening device 10 may include a thermometer to measure the environmental temperature, wherein in the event that the temperature is below a threshold temperature, the heat source 715 is activated.

In another variation, the vibration dampening device 10 includes a remote control unit 763 and a receiver unit 762. The receiver unit 762 is operatively coupled to the motor 761. The remote control unit 763 can be operated by a user thereby controlling the operation of the vibration dampening device 10. In one form, the remote control unit 763 includes an interface to activate the motor 761, wherein the remote control unit 763 generates and emits a radio signal indicative of an activation command. The receiver unit 762 receives the radio signal indicative of the activation command, and in response activates the motor 761. The activation of the motor 761 thereby activates the compressor 760, thereby activating the supply of fluid to the fluid fillable absorbers 40. The remote control unit 763 can also include an interface to deactivate the motor 761, wherein the remote control unit 763 generates and emits a radio signal indicative of a deactivation command. The receiver unit 762 receives the radio signal indicative of the deactivation command, and in response deactivates the motor 761, thereby deactivating the compressor 760 and the supply of fluid to the fluid fillable absorbers 40. The fluid control system 740 may also expel the fluid contained in the fluid fillable absorbers in response to the deactivation signal being received by the receiver unit 762.

In another variation, a rigid sheet 1099, such as a steel sheet, may be embedded within the polymer plate of the first and second section plates 21, 31. The embedded rigid sheet 1099 may be embedded during the manufacturing process of the polymer plates 21, 31. The embedded rigid sheet may have apertures cut therein prior to embedding in the plates, wherein the apertures correspond to apertures of the first and second plates.

Many modifications will be apparent to those skilled in the art without departing from the scope of the present invention.

The invention claimed is:

1. A vibration dampening device including:
    a first section having a first section support assembly which includes a first coupling to permit the vibration dampening device to be suspended via a first sling from a support apparatus;
    a second section having a second section support assembly which includes a second coupling to permit vibratory machinery to be hung from the vibration dampening device via a second sling;
    a plurality of fluid fillable absorbers, in fluid communication with a fluid source, located between the first and second sections for absorbing at least a portion of a vibratory force transferred from operation of the vibratory machinery, wherein the vibratory force causes displacement of the first section relative to the second section;
    a displacement feedback assembly for detecting displacement between the first and second sections; and
    a fluid control system, operatively connected to the displacement feedback assembly and in fluid communication with the plurality of fluid fillable absorbers, wherein the displacement feedback assembly is configured to actuate the fluid control system to control and allow the flow of fluid to the plurality of absorbers in response to detection of the displacement of the first section toward the second section due to the vibratory force and to control and allow the flow of fluid from the plurality of fluid fillable absorbers in response to detection of the displacement of the first section away from the second section due to the vibratory force, wherein at least one of:
        at least some of the plurality of fluid fillable absorbers fill with fluid at different filling rates substantially simultaneously; and
        at least some of the plurality of fluid fillable absorbers expel fluid at different expelling rates substantially simultaneously.

2. The vibration dampening device according to claim 1, wherein a portion of the first section support assembly protrudes through one or more second section apertures in the second section, and a portion of the second support assembly protrudes through one or more first section apertures in the first section.

3. The vibration dampening device according to claim 2, wherein the portion of the first section support assembly which protrudes through the second section aperture is one or more first section support arms, and the portion of the second section support assembly which protrudes through the first section aperture is one or more second section support arms.

4. The vibration dampening device according to claim 3, wherein the first coupling is coupled to the one or more first section support arms.

5. The vibration dampening device according to claim 3, wherein a second coupling is coupled to the one or more second section support arms.

6. The vibration dampening device according to claim 1, wherein the first section includes a first section plate and the second section includes a second section plate, the first and second section plates being respectively parallel and separated by the one or more fluid fillable absorbers.

7. The vibration dampening device according to claim 6, wherein the first section plate and the second section plate respectively include upper and lower rigid sheets.

8. The vibration dampening device according to claim 6, wherein the first section plate and the second section plate respectively include an embedded rigid sheet.

9. The vibration dampening device according to claim 6, wherein at least one of the first section plate and the second section plate are made substantially from a polymer material.

10. The vibration dampening device according to claim 9, wherein the polymer material is polyethylene.

11. The vibration dampening device according to claim 1, wherein fluid expelled from the plurality of fluid fillable absorbers is transferred to at least one of:
    the fluid source; and
    an exhaust assembly.

12. The vibration dampening device according to claim 1, wherein the fluid source is a pressurised fluid source.

13. The vibration dampening device according to claim 12, wherein the pressurised fluid source is a compressed air source.

14. The vibration dampening device according to claim 12, wherein the one or more fluid fillable absorbers are air bags.

15. The vibration dampening device according to claim 14, wherein each air bag includes a rolling-lobe and piston configuration.

16. The vibration dampening device according to claim 1, wherein the fluid source is a hydraulic fluid source.

17. The vibration dampening device according to claim 1, wherein the vibration dampening device includes a motor operatively connected to a compressor, wherein the compressor is operatively connected to the fluid supply.

18. The vibration dampening device according to claim 17, wherein the vibration dampening device includes a receiver unit operatively connected to the motor, wherein the receiver unit is responsive to a remote control unit to control the operation of the motor.

19. The vibration dampening device according to claim 1, wherein the first section includes first walls that extend toward the second section, and the second section includes second walls that extend toward the first section, wherein the first and second walls undergo telescopic movement relative to each other when vibratory force is being partially absorbed by the vibration dampening device.

20. A vibration dampening device including:
   a first section having a first section support assembly which includes a first coupling to permit the vibration dampening device to be suspended via a first sling from a support apparatus;
   a second section having a second section support assembly which includes a second coupling to permit vibratory machinery to be hung from the vibration dampening device via a second sling;
   one or more fluid fillable absorbers, in fluid communication with a fluid source, located between the first and second sections for absorbing at least a portion of a vibratory force transferred from operation of the vibratory machinery, wherein the vibratory force causes displacement of the first section relative to the second section;
   a displacement feedback assembly for detecting displacement between the first and second sections; and
   a fluid control system, operatively connected to the displacement feedback assembly and in fluid communication with the one or more fluid fillable absorbers, wherein the displacement feedback assembly is configured to actuate the fluid control system to control and allow the flow of fluid to the one or more fluid fillable absorbers in response to detection of the displacement of the first section toward the second section due to the vibratory force and to control and allow the flow of fluid from the one or more fluid fillable absorbers in response to detection of the displacement of the first section away from the second section due to the vibratory force, and wherein the fluid control system includes a directional control valve unit:
   wherein the displacement feedback assembly includes an arm member, a first leveller and a second leveller, wherein the first leveller is operatively coupled to the arm member and the fluid source, wherein the first leveller is actuated by movement of the arm member in response to the second section being displaced toward the first section, wherein actuation of the first leveller causes the fluid control system to control supply of fluid to the one or more fluid fillable absorbers, and wherein the second leveller is operatively coupled to the arm member and the fluid source, wherein the second leveller is actuated by movement of the arm member in response to the second section being displaced away from the first section, wherein actuation of the second leveller causes the fluid control system to control expulsion of fluid from the one or more fluid fillable absorbers.

21. The vibration dampening device according to claim 20, wherein the fluid control system includes a directional control valve unit including:
   a first port in fluid communication with the first leveller;
   a second port in fluid communication with the second leveller;
   a third port in fluid communication with the fluid source;
   a fourth port in fluid communication with the plurality of fluid fillable absorbers; and
   a fifth port in fluid communication with one of:
   the exhaust assembly; and
   the fluid source via a one way valve.

22. The vibration dampening device according to claim 21, wherein:
   in the event that the first port is actuated via actuation of the first leveller, the third and fourth ports are actuated by the directional control valve unit to allow fluid to be supplied from the fluid source to the one or more fluid fillable absorbers; and
   in the event that the second port is actuated via actuation of the second leveller, the fourth and fifth ports are actuated by the directional control valve to allow fluid to be expelled from the one or more fluid fillable absorbers.

* * * * *